Patented May 21, 1929.

1,713,512

UNITED STATES PATENT OFFICE.

LOUIS ETIENNE CLÉMENT, OF MEUDON, FRANCE, ASSIGNOR, BY MESNE ASSIGNMENTS, TO DU PONT-PATHE FILM MANUFACTURING CORPORATION, OF WILMINGTON, DELAWARE, A CORPORATION OF DELAWARE.

SOLVENT FOR NITROCELLULOSES.

No Drawing. Application filed November 25, 1924, Serial No. 752,259, and in France October 30, 1924.

The nitrocelluloses containing from 11 to 12 per cent of nitrogen are directly soluble (in the colloidal sense of the word) in a great variety of organic liquids such as acetone, the acetates or formates of ethyl, methyl, amyl and the like, and in numerous other organic compound ethers (esters). The nitrocelluloses are also soluble in mixtures of two liquids such as a mixture of ethyl alcohol at 95° and sulphuric ether, even though each of the said liquids, when taken separately, is not a direct solvent for the nitrocellulose. The said mixtures of solvents, which are termed "indirect solvents", are of value in certain industries such as the manufacture of artificial silk.

Since the more volatile constituent of the mixture is obviously the first to evaporate, the result will be a rupture of equilibrium in the said solvent, so that the nitrocellulose will form a jelly-like mass, and in this manner the manufacture will be more rapidly carried out and will afford a product having an internal contexture of a very special character.

The present invention relates to a new solvent for nitrocellulose consisting of a mixture of anhydrous alcohol, which in itself is not a solvent, with a suitable solvent for nitrocellulose such as acetone, the acetates or formates of the different alcohols (ethyl, methyl, amyl and others), or various other organic esters which are direct solvents for nitrocellulose.

In the said mixture, the anhydrous ethyl alcohol may be replaced by any other anhydrous alcohol which is not in itself a solvent for nitrocellulose, such for instance as butyl, amyl or like alcohol.

The above-mentioned mixtures are thus comprised in the class of indirect solvents, and possess all the advantages of the latter. As compared with mixtures of alcohol and sulphuric ether, they have the great advantage of being much less dangerous to handle, thus reducing the risks of fire or explosion. They are also less expensive.

Furthermore, they are superior to the known indirect solvents from the fact that the composition of the mixture can be selected in order to obtain the formation of the jelly-like mass with the desired rapidity and also to improve the dynamometric qualities of the films or threads of nitrocellulose which are obtained after the evaporation of the solvent.

The following mixtures may be given, by way of example, as affording excellent results:

|                            | Parts by volume. |
|----------------------------|------------------|
| Ethyl alcohol, anhydrous   | 80               |
| Acetone pure               | 20               | or,

|                            | Parts by volume. |
|----------------------------|------------------|
| Amyl alcohol, anhydrous    | 80               |
| Amyl acetate               | 20               |

With the above-mentioned solvents for nitrocellulose collodions can be obtained which are perfectly limpid and homogeneous, and which when formed into cinematographic films or threads of artificial silk will offer a remarkable improvement in the dynamometric qualities of these products.

The said solvents may be utilized in the manufacture of artificial silk, gun powder, photographic and cinematographic films, varnishes and coatings, artificial leather, and various other products, and in general, in all the industries employing nitrocellulose.

Obviously, the above-mentioned mixtures are given solely by way of example, and it is chiefly to be noted that the proportions may be varied within wide limits.

Having now described my invention, what I claim as new and desire to secure by Letters Patent is:

1. A solution adapted for shaping into and forming transparent films, artificial silk, and the like, which comprises essentially nitrocellulose and a solvent therefor, said solvent consisting of an anhydrous alcohol and an organic solvent for said nitro-cellulose.

2. A solution adapted for shaping into and forming transparent films, artificial silk, and the like, which comprises essentially nitrocellulose and a solvent therefor, said solvent consisting of anhydrous ethyl alcohol and an organic solvent for said nitro-cellulose.

3. A solution adapted for shaping into and forming transparent films, artificial silk, and the like, which comprises essentially nitrocellulose and a solvent therefor, said solvent consisting of an anyhdrous alcohol which is not of itself a solvent for said nitro-cellulose and an organic solvent for said nitro-cellulose.

4. A solution adapted for shaping into and forming transparent films, artificial silk, and the like, which comprises essentially nitro-cellulose and a solvent therefor, said solvent consisting of anhydrous ethyl alcohol and acetone.

5. A solution adapted for shaping into and forming transparent films, artificial silk, and the like, which comprises essentially nitro-cellulose and a solvent therefor, said solvent consisting of 80 parts by volume of an anhydrous alcohol and 20 parts by volume of an organic solvent for said nitro-cellulose.

6. A solution adapted for shaping into and forming transparent films, artificial silk, and the like, which comprises essentially nitro-cellulose and a solvent therefor, said solvent consisting of 80 parts by volume of anhydrous ethyl alcohol and 20 parts by volume of pure acetone.

In testimony whereof I have signed my name to this specification.

LOUIS ETIENNE CLÉMENT.